US 6,738,687 B2
May 18, 2004

(12) United States Patent
Hänel

(10) Patent No.: US 6,738,687 B2
(45) Date of Patent: May 18, 2004

(54) STORAGE SHELF

(75) Inventor: Joachim Hänel, Bad Friedrichshall (DE)

(73) Assignee: Hanel & Co., Altstatten (CH)

( * ) Notice: Subject to any disclaimer, the term of this patent is extended or adjusted under 35 U.S.C. 154(b) by 88 days.

(21) Appl. No.: 10/221,817

(22) PCT Filed: Mar. 15, 2001

(86) PCT No.: PCT/EP01/02959
§ 371 (c)(1),
(2), (4) Date: Sep. 16, 2002

(87) PCT Pub. No.: WO01/68486
PCT Pub. Date: Sep. 20, 2001

(65) Prior Publication Data
US 2003/0147738 A1 Aug. 7, 2003

(30) Foreign Application Priority Data
Mar. 17, 2000 (DE) .......................... 100 13 092

(51) Int. Cl.⁷ .............................. G06F 7/00
(52) U.S. Cl. .................. 700/214; 700/242; 414/289

(58) Field of Search ................. 700/213, 214, 700/236, 242, 244, 245, 258, 259; 414/289; 235/385

(56) References Cited

U.S. PATENT DOCUMENTS 5,506,682 A * 4/1996 Pryor .......................... 356/623
5,699,281 A * 12/1997 Crucius et al. ............. 702/159
6,315,513 B1 * 11/2001 Harukawa et al. .......... 414/286

* cited by examiner

Primary Examiner—Khoi H. Tran
(74) Attorney, Agent, or Firm—Stephen B. Salai, Esq.; Brian B. Shaw, Esq.; Harter, Secrest & Emery LLP

(57) ABSTRACT

A storage shelf (10) comprising a plurality of stacked supports (12) for supporting containers (13) of articles suitable for handling by an automated storage and retrieval device (15) including at least one storage and retrieval opening (20) for storage and retrieval of the containers (13) and a computer (17) in which information as to the stored articles (14) is memorized. To improve the overview of the stored articles at least one digital camera (16) is provided which senses the articles (14) held in the containers (13). The resulting digital information is memorized in the computer (17) for display by means of a monitor.

4 Claims, 2 Drawing Sheets 13  14

13  22

STORAGE SHELF

The invention relates to a storage shelf comprising a plurality of stacked supports for supporting containers of articles suitable for handling by an automated storage and retrieval device including at least one storage and retrieval opening for storage and retrieval of the containers and a computer in which information as to the stored articles is memorized.

It is known in storage shelves for storing a variety of articles to sense the nature and quantity of the articles held in the containers, it also being known in this respect to sense the quantity of the articles automatically by their weight. The sensed information is memorized via an inventory management program in the computer, on the monitor of which the memorized information is displayed.

The invention is based on the objective of proposing a storage shelf of the aforementioned kind in which the overview of the articles held in the containers is improved.

To achieve this objective it is proposed in accordance with the invention to provide in a high-bay shelf of the aforementioned kind at least one digital camera which senses the articles held in the containers and to memorize the digital information in the computer for display by means of a monitor.

In the storage shelf in accordance with the invention the articles held in the containers are now rendered visible at a single glance on the monitor without the container needing to be removed. Such visual information is significantly more operator-appreciative than digital data. In addition, the storage location within the container can also be sensed which is particularly of advantage where wide containers are involved.

Advantageous aspects of the invention read from the sub-claims.

To advantage the digital camera is arranged in the region of the storage and retrieval opening in this assuring that the articles are sensed by the digital camera in both storage and retrieval of the container.

In another aspect an imaging program memorized in the computer generates a raster system with which the number and size of free storage locations in the container can be sensed and displayed. The raster system may be configured two-dimensional or three-dimensional.

Figure 1:
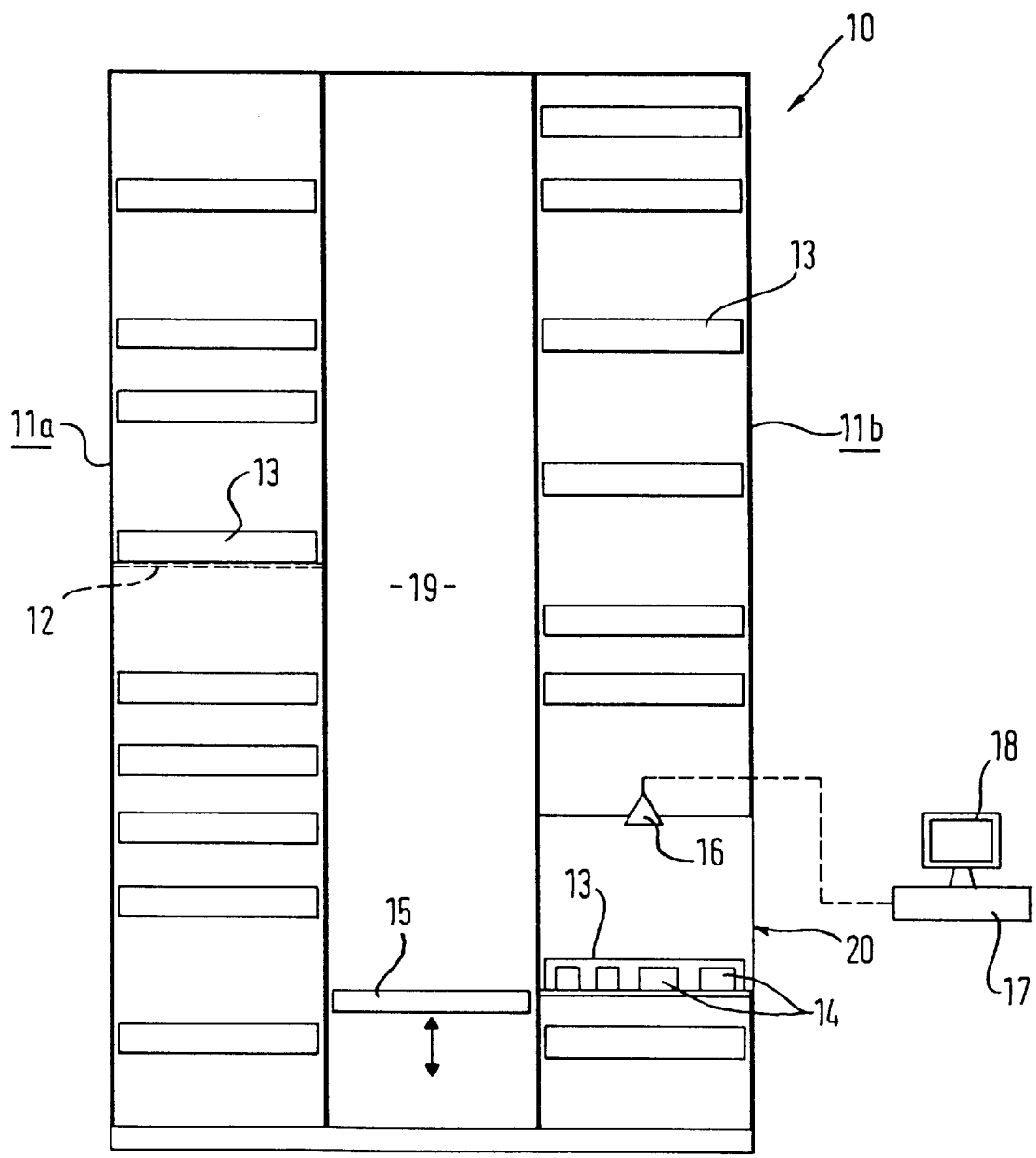
Figure 2:
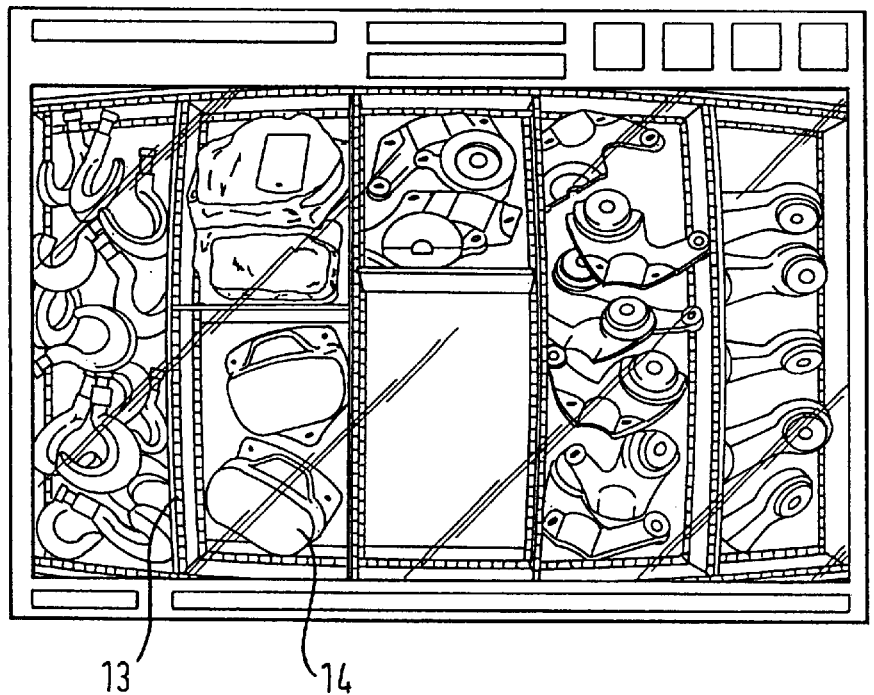
Figure 3:
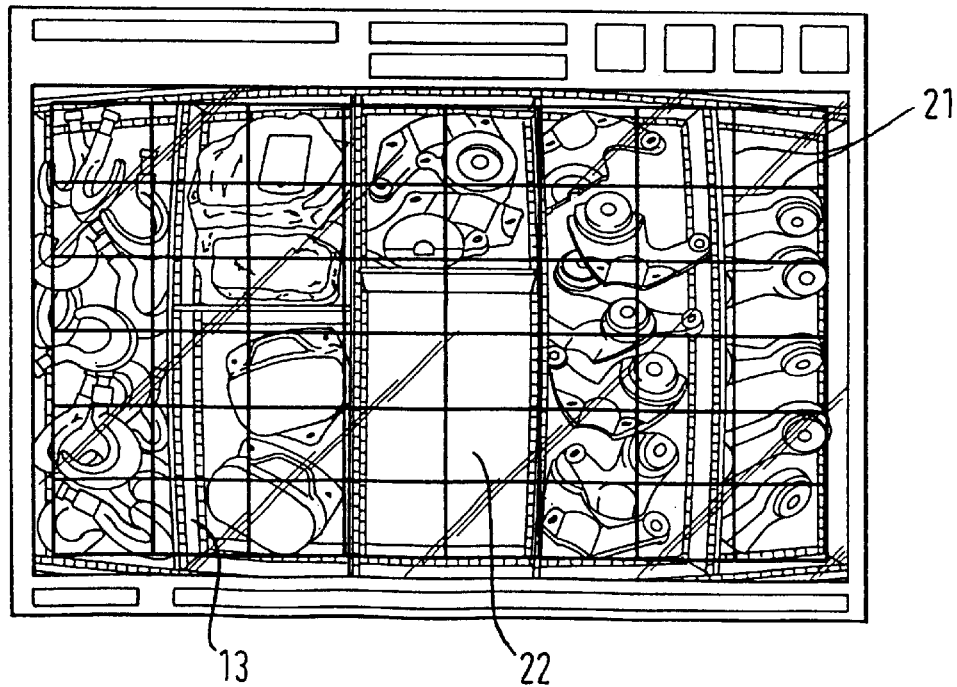

Further features and advantages of the invention will now be detailed by way of an example embodiment as shown in the drawing diagrammatically in which FIG. 1 is a side view of the storage shelf in accordance with the invention FIG. 2 is a monitor display of a container stored in the shelf and FIG. 3 is the same monitor display of the container as shown in FIG. 2 but with the generated raster system.

Referring now to FIG. 1 there is illustrated a diagrammatic side view of a storage shelf 10 comprising two stacks 11a, 11b arranged spaced away from each other. Provided between the stacks 11a, 11b is a conveying aisle 19 in which an automated storage and retrieval device 15 is travelled.

The stacks 11a, 11b comprise a plurality of supports 12 arranged in pairs spaced away from each other as located on opposing sidewalls. The supports 12 serve to receive the trough-shaped containers 13.

Provided at stack 11b is a storage and retrieval opening 20 via which the containers 13 can be stored or retrieved. Arranged at the upper side of the opening 20 is a digital camera 16 with which the articles 14 held in the containers 13 can be sensed. The information received from the digital camera is fed to a computer 17 in which an imaging program is memorized. The articles 14 held in the containers 13 can now be displayed on the monitor 18 without the container 13 having to be removed.

Referring now to FIG. 2 there is illustrated a visual display of the container 13 including the articles 14 held therein as seen on the monitor 18. As evident from this illustration, in addition to the quantity of the articles 14 held also their spatial arrangement in the container 13 is now evident at a single glance. The visual reproduction facilitates inventory management since the articles 14 held in the container 13 can now be appreciated at a single glance.

Referring now to FIG. 3 there is illustrated in the monitor image a raster system 21 as generated by the imaging program in thus enabling vacant storage locations 22 in the container 13 to be sensed. The raster system can be generated two-dimensionally or three-dimensionally.

What is claimed is:

1. A storage shelf comprising a plurality of stacked supports for supporting containers of articles suitable for handling by an automated storage and retrieval device including at least one storage and retrieval opening for storage and retrieval of the containers and a computer in which information as to the stored articles is memorized, that at least one digital camera which senses the articles held in the containers and in which that the digital information is memorized in the computer for display by means of a monitor.

2. The storage shelf as set forth in claim 1, in which the digital camera is arranged in the region of the storage and retrieval opening.

3. The storage shelf as set forth in claim 1 in which an imaging program memorized in the computer generates a raster system with which the number and size of free storage locations in the containers can be sensed and displayed.

4. The storage shelf as set forth in claim 2, in which an imaging program memorized in the computer generates a raster system with which the number and size of free storage locations in the containers can be sensed and displayed.

* * * * *